US011828979B2

(12) United States Patent
Jiang et al.

(10) Patent No.: US 11,828,979 B2
(45) Date of Patent: Nov. 28, 2023

(54) CONFIGURING INFRARED OPTICAL FIBERS FROM OXIDE GLASSES

(71) Applicant: AdValue Photonics, Inc., Tucson, AZ (US)

(72) Inventors: Shibin Jiang, Tucson, AZ (US); Garrett Coleman, Oro Valley, AZ (US); Tao Luo, Tucson, AZ (US)

(73) Assignee: ADVALUE PHOTONICS, INC., Tucson, AZ (US)

( * ) Notice: Subject to any disclaimer, the term of this patent is extended or adjusted under 35 U.S.C. 154(b) by 0 days.

(21) Appl. No.: 17/544,486

(22) Filed: Dec. 7, 2021

(65) Prior Publication Data

US 2023/0176278 A1    Jun. 8, 2023

(51) Int. Cl.
    *G02B 6/02* (2006.01)
(52) U.S. Cl.
    CPC ..... *G02B 6/02328* (2013.01); *G02B 6/02338* (2013.01)
(58) Field of Classification Search
    CPC .......................... G02B 6/02328; G02B 6/02338
    See application file for complete search history.

(56) References Cited

U.S. PATENT DOCUMENTS

| 2009/0143212 | A1* | 6/2009 | Tran | C03C 15/02 |
| | | | | 65/429 |
| 2011/0274924 | A1* | 11/2011 | Jiang | C03C 13/04 |
| | | | | 428/375 |
| 2014/0204456 | A1* | 7/2014 | Chavez-Pirson | G02F 1/3555 |
| | | | | 359/326 |
| 2020/0317557 | A1* | 10/2020 | Gibson | C03B 37/0122 |

FOREIGN PATENT DOCUMENTS

| CN | 111812772 | A | * | 10/2020 | ......... B29C 35/0805 |
| CN | 113433610 | A | * | 9/2021 | ............... G02B 6/02 |
| WO | WO-0214946 | A1 | * | 2/2002 | ....... C03B 37/01205 |

* cited by examiner

*Primary Examiner* — Daniel Petkovsek
(74) *Attorney, Agent, or Firm* — Quarles & Brady LLP; Yakov S. Sidorin

(57) ABSTRACT

An IR-transmitting glass fiber configured to include a holey-microstructured core and a cladding surrounding the core. Glass material used at least in the core is one of the heavy metal oxide glasses, where the glass network former is an oxide selected from $GeO_2$, $TeO_2$, $Sb_2O_3$, and $Bi_2O_3$, while each and every component of the fiber includes only an oxide glass material and is devoid of any other materials.

10 Claims, 2 Drawing Sheets

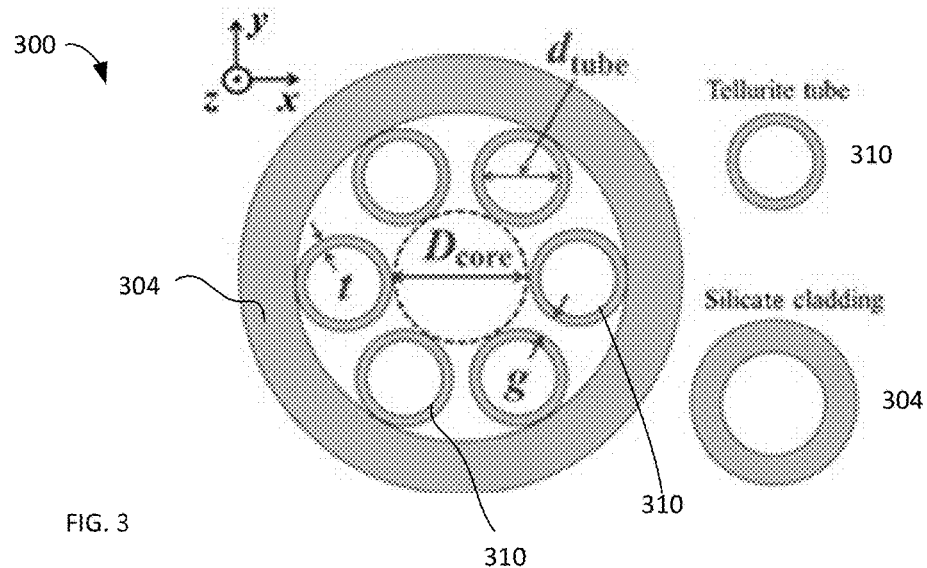
FIG. 3
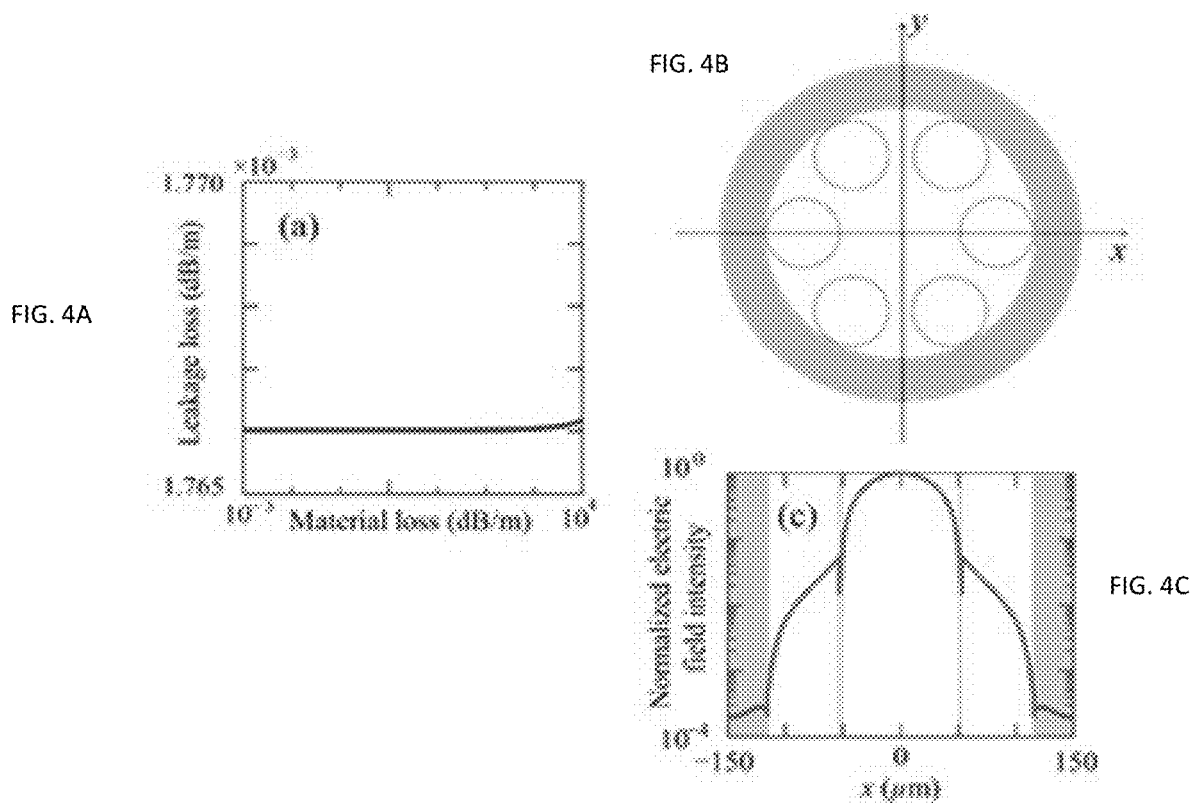
FIG. 4A
FIG. 4B
FIG. 4C

CONFIGURING INFRARED OPTICAL FIBERS FROM OXIDE GLASSES

TECHNICAL FIELD

The present invention relates to fiber optical elements configured to channel light at infrared wavelengths and, more specifically, to optical fibers transmitting infrared light (interchangeably referred to herein as IR-transmitting fibers) that are fabricated from oxide glasses.

RELATED ART

Optical fibers for IR light transmission at a wavelength in the range from about 1 micron to about 20 microns—and, in particular, in the range from about 2 microns to about 6 microns—are desirable for and usable in a wide variety of applications such as chemical and temperature sensing, delivery of laser light (including light delivery for spectroscopy, infrared imaging, and infrared countermeasure systems), to name just a few. An IR-transmitting fiber is expected to have low attenuation (typically, <3 dB per meter) within the 2 . . . 6 micron range of wavelengths, to be able to handle high optical power (>100 W), be structured to guide light preferably in a mode with a substantially Gaussian spatial distribution of light, and be mechanically and chemically durable. However, existing IR-transmitting fibers (developed over many years using chalcogenide, halide, fluoride, and other exotic glass compositions) remain expensive, brittle, and fragile, all of which limit their practical applications.

For example, the problem of lowering the impurity-induced optical loss while still increasing the IR-transmitting wavelength limit of the fiber has not been solved, which still prevents IR-transmitting fibers made from the above-identified glasses or glass compositions from reaching high-power, ultra-low optical attenuation performance. Furthermore, as evidenced by related art, the majority of such IR-transmitting fibers are still subject to being toxic and having low mechanical strength (see, for example, Chenard, F. et al., "MIR Chalcogenide Fiber and Devices", in *Opt. Fibers Sensors Med. Diagnostics Treat. Appl. XV* 2015, 9317, 93170B). Indeed, the optical absorption of a solid material in the long-wavelength limit is determined by the multiphonon, or IR absorption edge and arises from the inner molecule or lattice vibrations. As will be appreciated by one of ordinary skill in the art, to push the infrared absorption edge toward longer wavelengths, the forces of attraction between ions should be low (i.e., the mass of the ions should be high). Phrased another way, the glass that is strongly transmissive in the IR wavelength remains inherently physically weak—and the currently-used chalcogenide-glass-based optical fibers are not an exception to this rule (which is practice results, for example, in extreme difficulties of using such fibers in in assembly of a fiber optical cable).

In addition, the IR-transmitting fibers made from the above-identified glass materials maintain very low damage thresholds (see Gattass, R. R., et al., "Review of Infrared Fiber-Based Components", in *Appl. Opt.* 2015, 54 (31), F25); continue suffering from photo-darkening (see Boolchand, P., et al., "Molecular Structure and Quenching of Photodarkening in As2Se3: Snx Amorphous Films" in *Chalcogenide Lett.* 2005, 2 (4), 27-34); and possess very high nonlinear optical properties due to inherent large nonlinear refractive indices (see, for example, Lamont, M. R., et al., "Supercontinuum Generation in Dispersion Engineered Highly Nonlinear ($\gamma$=10/W/m) $As_2S_3$ Chalcogenide Planar Waveguide", in *Opt. Express* 2008, 16 (19), 14938).

On the other hand, typical oxide glasses cannot be used for IR-transmitting fiber with any practical efficiency because of the poor transmission characteristics of such glasses at IR wavelengths.

As a skilled artisan will readily appreciate, at least for these reasons practical solutions of engineering the proper glass compositions with intent to achieve greater impurity control to demonstrate a practical IR-transmitting fiber will necessarily remain an extremely challenging task if the same existing conventional logic of the optical fiber structuring with the use of the above-identified materials is followed.

SUMMARY

Embodiments of the invention provide an IR-transmitting glass fiber configured to include a holey-microstructured core and a cladding surrounding the core. Here, glass material used at least in the core is one of the heavy metal oxide glasses, where the glass network former is an oxide selected from $GeO_2$, $TeO_2$, $Sb_2O_3$, and $Bi_2O_3$, while each and every component of the fiber includes only an oxide glass material and is devoid of any other materials.

In another implementation, an IR-transmitting glass fiber contains a holey-microstructure core and the core glass material is one of the heavy metal oxide glasses, where the glass network former is an oxide selected from $GeO_2$, $TeO_2$, $Sb_2O_3$, and $Bi_2O_3$. The cladding surrounding the core is made from another group of oxide glasses where the glass network former is selected from $SiO_2$, $P_2O_5$, $GeO_2$, $B_2O_3$, and $Al_2O_3$. Each and every component of the fiber utilizes only an oxide glass material and is devoid of any other material. (In a specific case the material of the core includes only $TeO_2$ and the material of the cladding includes only $SiO_2$.)

In any embodiment, the fiber is characterized by a loss figure (representing propagation of light at a wavelength between about 2 microns and about 6 microns through such fiber of less than 3 dB/meter. In substantially any case, the cladding region may be structured as a hollow cylinder coaxial with the axis of the fiber, while the holey-microstructured core region may include an array of tubular elements that are tangentially-parallel to one another and disposed substantially equidistantly from an axis of the fiber inside the cladding region. (In the specific embodiment, a separation distance between axes of any two immediately-neighboring tubular element from the array of tubular element is maintained substantially constant across the array; and/or the holey-microstructured core region may include a hollow surrounded by said array, a cross-sectional dimension of said hollow being between about 10 microns and about 500 microns.) Practically in any implementation of the idea of the invention, a region of the fiber not occupied by the tubular elements and extending along the axis of the fiber may be filled with a first gas, and/or the hollows of the tubular elements of the array are filled with a second gas.

Embodiments of the invention additionally provide a method of transmitting light through an IR-transmitting glass fiber. Such method includes launching light with a wavelength within the spectral region from about 2 microns to about 6 microns into an input facet of the embodiment of the above-described fiber and/or receiving the light, that has been channeled by the fiber with a propagation loss not exceeding 3 dB/meter, from an end facet of the fiber.

BRIEF DESCRIPTION OF THE DRAWINGS

Implementations of the invention will become more apparent from the detailed description set forth below when taken in conjunction with the drawings, in which like elements bear like reference numerals.

FIG. 3 illustrates a cross-section view of a specific embodiments of a microstructured holey optical fiber configured according to the idea of the invention.

FIGS. 4A, 4B, 4C illustrate low optical loss provided by an embodiment of the invention despite the presence of the silica glass in the cladding region. FIG. 4A: Impact of material loss in the cladding on the leakage loss of the fundamental mode. FIG. 4B: cross-sectional schematic of the fiber (similar to that of FIG. 3). FIG. 4C: Normalized electric filed intensity along the x-axis of the fiber, as shown in FIG. 4B. Silica materials loss is set as 4800 dB/m corresponding to the material loss at 4 μm.

Figure 1:
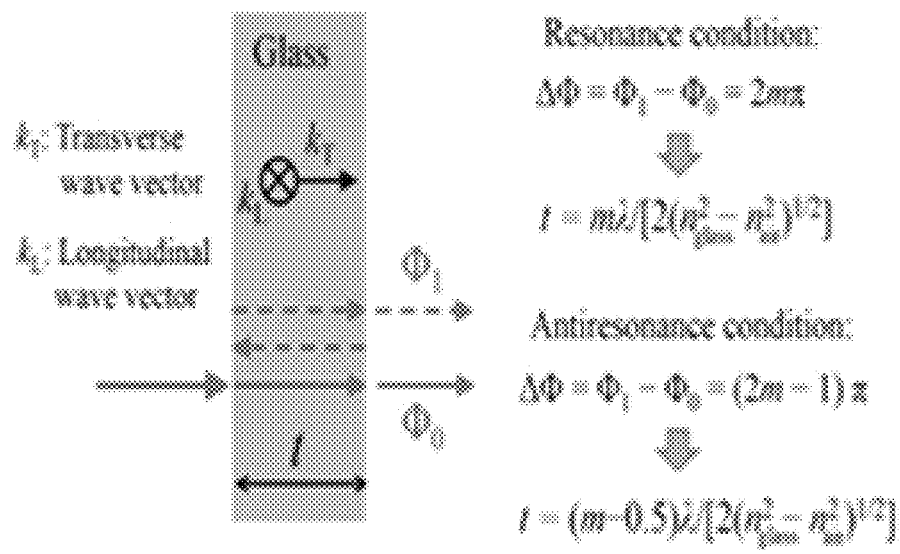
FIG. 1 illustrates a resonance condition required for operation of a holey micro-structured fiber.

In the Drawings, generally, like elements and/or components may be referred to by like numerals and/or other identifiers. Generally, the sizes and relative scales of elements in Drawings may be set to be different from actual ones to appropriately facilitate simplicity, clarity, and understanding of the Drawings. For the same reason, not all elements present in one Drawing may necessarily be shown in another. The specific embodiments are illustrated in the drawings are intended to be illustrative and not limiting the scope of the invention.

DETAILED DESCRIPTION

As was already alluded to above, the use of halide, fluoride, and chalcogenide glasses in particular has been considered to be critical in achieving light transmission in optical fibers that reaches far into the IR portion of the spectrum. Unfortunately, no fiber has been produced over the last several decades that would meet all of the design requirements. In particular, chalcogenide-glass based optical fibers still have not been capable of transmitting tens of Watts of optical power because of fundamental material properties of such glasses and currently-used methods of material purification. Another remaining weakness of the IR-transmitting fibers made of the currently-preferred materials remains a fiber-damage threshold that is extremely low and photo-darkening that exponentially increases the optical absorption of the fiber as a function of light intensity. At the same time, practical implementation of the IR-transmitting fibers from the conventional oxide glasses stumbles over the inherent low optical transmission. Any practical solution of the persisting problems begs a fundamental shift in the paradigm of development of IR-transmitting fibers.

According to the idea of the invention, the above-identified practical problems from which the IR-transmitting fiber fabricated in a conventional fashion continue to suffer are solved by configuring an IR-transmitting optical fiber as a micro-structure holey fiber made of a metal-oxide glass material where the glass network former is selected from $GeO_2$, $TeO_2$, $Sb_2O_3$, and $Bi_2O_3$ or a combination of these materials.

A typical step index optical fiber has a core (with a higher refractive index) and cladding (with a lower refractive index) to guide light in the core via the total internal reflection (TIR).

A structure of the so-called photonic crystal fiber (PCF) was initially demonstrated to have a centrally-located solid core with the holey cladding region that included hexagonally spaced air holes extended along the entire length of the fiber with one missing defect hole. This holey cladding forms an effective low-refractive-index material and, therefore, confines light primarily in the central core. The effective index of the cladding is determined by the fundamental space-filling mode and can be calculated using the tight binding model. The light confinement mechanism is still effectively the same as in conventional step-index fibers that utilize total internal reflection.

The hollow-core photonic bandgap fibers are known that utilize a two-dimensional periodic cladding structure with an air core in the center: these fibers attracted lots of interest due to their potential to realize optical properties not achievable with the use of conventionally-structured fibers. It is believed that the hollow-core photonic bandgap fibers can overcome some of the fundamental limitations of conventional step-index fibers and can in theory lead to lower nonlinearity, and a higher damage threshold. The central core that confines the light, can be filled with a gas or gases or other materials, leading to long light—matter interaction lengths.

Recent research on micro-structured fibers led to the idea of the so-called negative curvature fibers that include a ring of tubes. Such fibers take advantage of both the simple cladding structure and the negative curvature of the core boundary. In a negative curvature fiber, a vector normal to the surface of the core boundary is directed oppositely to a radial unit vector. The negative curvature inhibits coupling between the fundamental core mode and the cladding modes. The cladding modes are modes that, upon the propagation along the fiber, reside primarily inside the tubes, in the glass, or in the interstices between the tubes and the outer glass ring. Antiresonance is required to inhibit coupling between core and cladding modes in negative curvature fibers, but the presence of the antiresonance is not sufficient: it was shown that a combination of antiresonance in the glass at the core boundary and a wavenumber mismatch between the core modes and the cladding modes inhibits the coupling between these modes leads to low optical loss. By taking advantage of inhibited coupling, negative curvature fibers made of silica have been demonstrated with low transmission loss of the order of 10 dB/km (see, for example, A. N. Kolyadin, et al., "Light transmission in negative curvature hollow core fiber in extremely high material loss region," Opt. Express 21, 9514-9519, 2013; or N. V. Wheeler, et al., "Low-loss Kagome hollow-core fibers operating from the nearto the mid-IR," Opt. Lett. 42, 2571-2574, 2017). Lower losses are relatively easier to achieve at larger core diameters (as was shown by A. F. Kosolapov, et al., "Hollow-core revolver fibre with a double-capillary reflective cladding," Quantum Electron. 46, 267-270, 2016).

Since no bandgap is used in negative curvature fibers, such fibers do not require a cladding structure that is periodic. The simplicity of the negative curvature structure opens up the possibility of fabricating fiber devices for mid-IR applications using non silica glasses such as chalcogenide glasses, since the development of hollow-core chalcogenide fibers has been hampered by fabrication difficulties (see V. S. Shiryaev, "Chalcogenide glass hollow-core microstructured optical fibers," Front. Mater. 2, 24, 2015).

Figure 2A:
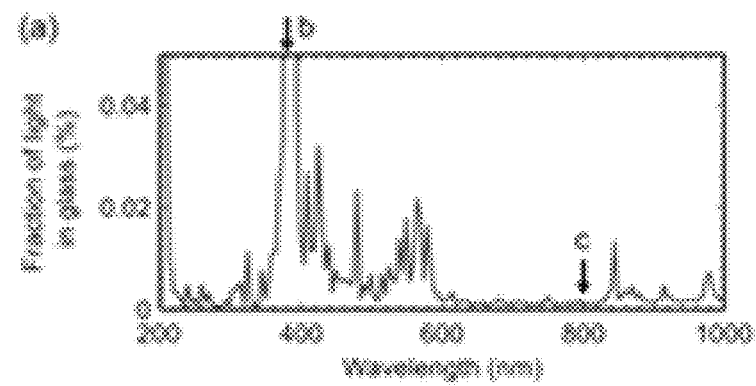
FIGS. 2A, 2B illustrate percentage of light propagating through the microstructure holey fiber that interacts with the glass material of the fiber (for a Kagome PCF fiber.)
Figure 2B:
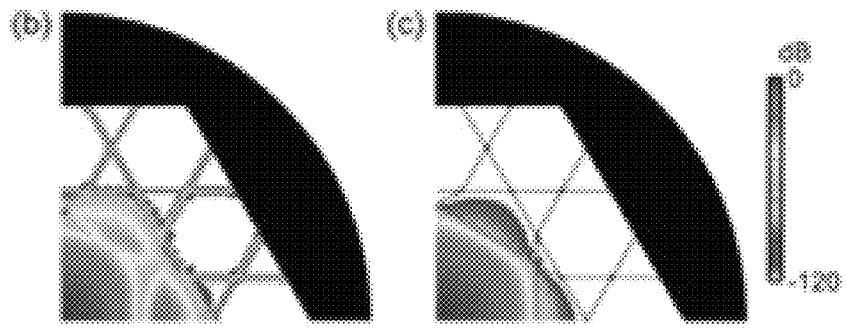

Utilization of micro-structuring the optical fiber in a holey fashion may be of use because the waveguide phenomenon of negative curvature may allow many of the once considered fundamental material limits to be surpassed. In particular, such structuring allows the cut-off of fibers to be extended, and enables the broadening of the selection of the glass host materials. Other interesting properties that can be controlled include an ultra-low refractive index, dispersion control, and attenuation below the best purity limit. These properties may become possible because the majority (~99.99%) of light transmitted through such fiber travels through air while only a small fraction (~0.01%) of channeled light interacts with the glass waveguide material. In other words, the light takes on the properties associated with traveling through air, or whatever gas the hollows of the fiber may be filed with. The transmission process occurs through anti-resonance 'bands' created by the microstructure and persist as 'windows' of low loss and high loss. FIG. 1 schematically illustrates the resonance condition where a multiple of a of the reflected light phase generates destructive interference resulting in high loss upon light propagation. (FIGS. 2A, 2B illustrate percentage of light interacting with the glass material in a Kagome PCF fiber, see N. V. Wheeler, et al., in Opt. Lett. 42, 2571-2574, 2017). Accordingly, when this condition is not satisfied, low propagational loss may be achieved.

However, as a skilled person will readily appreciate, such micro-structuring of the core region of a fiber is not sufficient for the purposes of fabricating mechanically-strong IR-transmitting fibers with low losses in the region from about 4 microns top about 6 microns if used alone. The idea of the invention stems from the realization that spatial distribution of electromagnetic field across the microstructured holey core region of the optical fiber can be configured to have the electromagnetic field substantially avoid the region of the fiber cladding and concentrated in the region of the core. According to the idea of the present invention, not only glasses from the first group of heavy metal oxide glasses (such as germanate glasses, tellurite glasses, antimony glasses, Bismuth oxide glasses, where the glass network former is one oxide selected from $GeO_2$, TeO2, Sb2O3, and Bi2O3 or a combination of such glasses) are used in the core region of the fiber while such core region is judiciously micro-structured (to provide for mechanical strength substantially exceeding that of fibers made from chalcogenide or fluoride glasses while establishing high optical transmission at the wavelengths of interest), but, additionally, glass material(s) from the second group of oxide glasses—the ones with lower heavy metal contents (such as silicate, phosphate, borate, aluminate glasses, and possibly germanate glasses)—are used for formation of the cladding region of the fiber that substantially overlap with the electromagnetic field of light propagating through the fiber. Accordingly—and in contradistinction with conventional fiber structures—the material for the cladding region of the fiber now can and is selected from another group of oxide glasses where the glass network former is selected from $SiO_2$, $P_2O_5$, $GeO_2$, $B_2O_3$, and $Al_2O_3$ and a combination thereof to further increase the strength of the fiber (which under conventional circumstances would introduce substantial optical losses). Each and every material used in the fiber is an oxide glass material as understood in the art.

In reference to the specific example of FIG. 3, illustrating a cross-section of a microstructured holey optical fiber 300 configured according to the idea of the invention—the cladding 304 may be made of the silicate glass while the microstructured region (a ring of tubular structures 310 around the hollow core region) may be made of a telluride glass. It is understood that, generally, the wall of a tubular structure 310 does not have to be cylindrical, but may possess, for example, a polygonal cross section.) Depending on the specifics of a particular implementation, a hollow portion of the core region may be filled with a first gas and the hollow of the tubular elements may be filled with a second gas (in one particular case, the first and second gases may be the same gas).

Notably, the presence of the conventionally-undesirable (for the reasons of introducing high optical losses) silica glass in an embodiment of the IR-transmitting fiber 300 unexpectedly does not introduce high optical losses due to the structure of the fiber that cases very little—if any—interaction of channeled light with the cladding region 304. To clearly demonstrate that in FIGS. 4A, 4B, and 4C, the level of optical attenuation of the cladding region 304 was set to $10^4$ dB/m to simulate glass cladding made from silica glass. It was determined that the loss does not change substantially because the electric field is four orders of magnitude greater in the core region 310 (telluride glass) than the in the cladding region 304: see FIG. 4C. While these results were obtained for a specific geometrical configuration of the embodiment of a holey microstructured IR-transmitting fiber (as seen in FIGS. 4A-4C, $D_{core}$ of about 100 microns, t of about 1 to 3 microns, $d_{tube}$ of about 50 . . . 70 microns), it is appreciated that a holey micro-structured IR-transmitting fiber structured according to the idea of the invention is characterized by the desired propagation loss (for light at the target wavelength within the spectral range from about 2 microns to about 6 microns) of less than 3 dB/meter for wide range of geometrical parameters, including the dimensions of the core region $D_{core}$ from about 10 microns to about 500 microns, while possessing the mechanical strength typical in fibers made of conventional (non-heavy-metal) oxide glasses. It is concluded, therefore, that the proposed holey micro-structured configuration of the IR-transmitting fiber reliably enables efficient use of glass hosts with cutoff wavelength at 4-5 microns for mid-IR fiber in the 2-6 mm region, which facilitates the used of some heavy metal oxide glasses can be used as the core glass material for a mid-IR fiber while at least a silicate, or phosphate, or borate, or aluminate glass can be used as the outside layer material because this layer almost doesn't affect the IR propagation properties.

In at least one implementation, a non-heavy-metal oxide glass composition may be used for the cladding region that exhibits high mechanical strength and relatively low softening temperature (for example, around 500 dec Centigrade). As the starting point, the low melting point borosilicate glasses can be used. Alkali oxides such as $K_2O$, $Na_2O$ and $Li_2O$ typically can reduce the softening temperature of the glass significantly. At the same time a high content of $K_2O$ and $Na_2O$ will reduce the chemical durability and mechanical strength. The presence of $Li_2O$ can effectively reduce the softening temperature and at the same time maintain the high mechanical strength. The $SiO_2$ content could be around 45 wt % and the $B_2O_3$ content could be around 15 wt %. In these borosilicate glasses, $B_2O_3$ is also glass network former.

Overall, embodiments of the invention manifest in an IR-transmitting fiber configured as a hybrid micro-structured holey fiber meeting mid-IR operational by effectively combining the low propagation loss in the in the 2-6 micron spectral region, excellent mechanical strength and chemical durability. In an embodiment, heavy metal oxide glass is used for fabrication of the holey-microstructure core region of the fiber to achieve the optical attenuation that is at least two-orders of magnitude lower than that in a bulk material. At the same time, a physically strong glass, such as silicate glass, with performance to that of a typical optical glass is used as the outside (cladding) layer material without any substantial influence on the loss figure associated with propagation of light through the fiber. This proposed hybrid tellurite-silicate fiber has the following features: a. Using heavy metal oxide glass materials for mid-IR delivery fiber for the first time to the best of our knowledge for wavelength longer than 5 micron; b. Ultra low loss transmission (<3 dB/meter) in the 2-6 micron region. c. Ability to surpass solid core fiber attenuation (typically in excess of 20 dB/meter) in the same spectral region because of the holey-microstructured configuration. d. High laser damage threshold capability of heavy metal oxide glass than chalcogenide and fluoride glasses. e. Very low photo-darkening to handle high laser power. f Excellent mechanical strength and chemical durability because of the use of silicate glass cladding layer.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s).

We claim:

1. An infrared (IR) transmitting glass fiber comprising:
    a holey-microstructured core region made of a first material and a cladding region surrounding the holey-microstructured core region and made of a second material,
    wherein the first material is a first heavy metal oxide glass material in which a first glass network former is an oxide selected from $TeO_2$, $Sb_2O_3$, $Bi_2O_3$, and a combination thereof;
    wherein the second material is a second oxide glass material in which a second glass network former is selected from $SiO_2$, $P_2O_5$, $B_2O_3$, $Al_2O_3$, and a combination thereof, and
    wherein each and every glass material of the fiber includes only an oxide glass material.

2. An IR-transmitting glass fiber according to claim 1, dimensioned to concentrate an electromagnetic field of light at a wavelength between about 2 microns and about 6 microns, when supported by said fiber, in the core region and to substantially avoid the cladding region, thereby causing a loss figure characterizing propagation of said light through said fiber to not exceed 3 dB/meter.

3. An IR-transmitting glass fiber according to claim 1,
    wherein the cladding region is a hollow cylinder coaxial with the axis of the fiber, and
    wherein the holey-microstructured core region includes an array of tubular elements that are tangentially-parallel to one another and disposed substantially equidistantly from the axis of the fiber inside the cladding region.

4. An IR-transmitting glass fiber according to claim 3, wherein a separation distance between axes of any two immediately-neighboring tubular elements from the array of tubular elements is maintained substantially constant across the array.

5. An IR-transmitting glass fiber according to claim 3, wherein the holey-microstructured core region includes a hollow surrounded by said array of tubular elements, a cross-sectional dimension of said hollow being between about 10 microns and about 500 microns.

6. An IR-transmitting glass fiber according to claim 5, wherein a region of the fiber not occupied by tubular elements of the array of the tubular elements and extending along the axis of the fiber is filled with a first gas.

7. An IR-transmitting glass fiber according to claim 5, wherein hollows of tubular elements of the array of the tubular elements are filled with a second gas.

8. An IR transmitting glass fiber according to claim 1, wherein the first material includes only $TeO_2$ and the second material includes only $SiO_2$.

9. A method of transmitting light through an IR-transmitting glass fiber, comprising:
    providing the IR-transmitting glass fiber according to claim 1; and
    launching light with a wavelength within the spectral region from about 2 microns to about 6 microns into an input facet of said fiber.

10. A method according to claim 9, further comprising:
    receiving said light, that has been channeled by the fiber with a propagation loss not exceeding 3 dB/meter, from an end facet of the fiber.

* * * * *